(12) United States Patent
Brodsky

(10) Patent No.: US 12,117,374 B2
(45) Date of Patent: Oct. 15, 2024

(54) COLD WEATHER AIR CONDITIONER TESTING ENVIRONMENT

(71) Applicant: Martin E Brodsky, Morganville, NJ (US)

(72) Inventor: Martin E Brodsky, Morganville, NJ (US)

( * ) Notice: Subject to any disclaimer, the term of this patent is extended or adjusted under 35 U.S.C. 154(b) by 380 days.

(21) Appl. No.: 17/300,824

(22) Filed: Nov. 22, 2021

(65) Prior Publication Data

US 2022/0170824 A1   Jun. 2, 2022

Related U.S. Application Data

(60) Provisional application No. 63/118,777, filed on Nov. 27, 2020.

(51) Int. Cl.
*F24F 11/49* (2018.01)
*G01M 99/00* (2011.01)
*G01N 17/00* (2006.01)

(52) U.S. Cl.
CPC .......... *G01M 99/008* (2013.01); *F24F 11/49* (2018.01); *G01M 99/002* (2013.01); *G01M 99/005* (2013.01); *G01N 17/002* (2013.01)

(58) Field of Classification Search
CPC ............. G01M 99/008; G01M 99/002; G01M 99/005; F24F 11/49; G01N 17/002; E04H 15/02
USPC .......... 374/45; 135/87, 91–94, 96; 165/11.1, 165/11.2; 62/125; 73/865.6, 865.9, 40, 73/40.5 R, 168
See application file for complete search history.

(56) References Cited

FOREIGN PATENT DOCUMENTS

CN    205228844 U  *  5/2016
KR    102283905 B1 *  8/2021

* cited by examiner

*Primary Examiner* — Robert R Raevis
(74) *Attorney, Agent, or Firm* — Charles In Brodsky

(57) ABSTRACT

A self-contained shelter environment which permits the testing of air conditioning systems at temperatures below the manufacturer's recommended operating range for the compressor thereof.

19 Claims, 6 Drawing Sheets

COLD WEATHER AIR CONDITIONER TESTING ENVIRONMENT

CROSS REFERENCE TO RELATED APPLICATIONS

A provisional patent application covering the invention described herein was filed on Nov. 27, 2020, and assigned Serial No. 63118777

STATEMENT REGARDING FEDERALLY SPONSORED RESEARCH OR DEVELOPMENT

Research and development of this invention and Application have not been federally sponsored and no rights are given under any federal program.

REFERENCE TO A MICROFICHE APPENDIX

Not Applicable

BACKGROUND OF THE INVENTION

Field of the Invention

This invention relates to creating an environmentally controlled self-contained environment to permit the testing of outdoor Air Conditioning Compressors in weather below the manufacturer specified operating temperature range.

Description of the Related Art

As has been described, there are approximately five (5) million residential real estate closings per year. A majority of those homes have central air conditioning systems that are split into two main components: a) the evaporator coil/chiller and blower motor, which are contained inside the home; and b) the outdoor unit, which contains the condenser coil, compressor, electrical components and a fan, located outdoors and unprotected from the elements. These systems are designed to very tight design tolerances, requiring not only specific kinds of refrigerant, but also the oil/lubricants. These systems are also designed to operate in a fairly narrow range of temperatures. Although there are commercial special-use air conditioning systems designed to operate in all kinds of weather (providing cool air to factories, computer centers, laboratories in the winter), most residential systems are only designed to operate when the temperature outdoors is above 65° F.—making sense, as below 65° F., people switch their thermostats to heat their homes. If the units are operated when the temperatures are below 65° F., on the other hand, it is likely to cause damage to the unit, which could cause not only a large repair bill, but often a requirement to replace the entire system. This is especially true in the United States where the refrigerant used in Air Conditioning Systems has been required to be changed from R22 (Freon) to R410a (Puron) by the EPA. These refrigerants are not interchangeable, and if an older R22 system has a major failure, replacement of the entire system to an R410a system is required. This is a $7,000.00-$12,000.00 cost including installation.

A majority of the geographical United States is below 65° F. at least 6 months of the year; and in the winter months, even Florida, California and Texas spend several months with an average high temperature below 65° F.

Due to the seasonal weather changes and the narrow operating range of Air Conditioning Systems, millions of real estate purchasers a year are unable to test the air conditioning systems on the homes they are purchasing prior to closing. Home Inspectors are prohibited from activating the systems when the minimum temperature has not been at or above 65° F. for at least three days in a row to permit the exterior elements of the system to settle in to the desired temperature and lubricant viscosity. This prohibition of testing, is to protect the air conditioning system from damage, and the inspector from liability for damaging the Seller's system.

This inability to test the air conditioner leaves several options to the Buyers: 1) If a Seller is willing to make such representation, to accept the Seller's representation that the air conditioner worked properly when last in use (Take the risk that it doesn't work.); 2) Try to negotiate with the Seller an escrow deposit to cover any possible malfunction when the system is activated the next year (Rarely if ever agreed to); or 3) purchasing a one year home warranty for close to $1,000.00 to protect the Buyer from catastrophic system failure (Most have limits on HVAC coverage and include a significant deductible.)

Given the huge expense of buying a home, and the relatively large expense of replacing an air conditioner system, buyers uncertainty of the operation of this expensive and critical system could result in the transaction being cancelled, suffering the stress of not knowing if the system works until it is finally activated in the summer, or expending nearly $1000.00 for a one year warranty. Since at least half of all closing sales happen during a time of the year when the central air condition system cannot be tested, millions of these purchasers face the dilemma of not being able to get one of the most critical systems of the home inspected before agreeing to move forward with the purchase contract and close.

OBJECTIVE OF THE INVENTION

It is an object of the present invention, therefore, to provide an approach that permits the activation and testing of a split residential air conditioning system when the temperature outside drops below 65° F.

It is a further object to provide such an arrangement that includes various components that when put together, creates an environmentally controlled shelter that works not only to bring the exterior components of the air conditioning system into the operating range designated by the manufacturer, but to keep it within that range during its operation and testing.

SUMMARY OF THE INVENTION

Such objectives of the invention are had in one embodiment of the invention through the use of a lightweight, insulated, mobile, collapsible shelter which engulfs not only the air conditioning compressor but also the ground/earth surrounding the compressor. An integrated heating/ventilation unit is included which regulates the temperature inside the shelter, and a heated umbilical is included to regulate the temperature of the compressor lines that feeds the refrigerant to and from the indoor portion of the air conditioning system. Means for permitting ventilation of the shelter when the air conditioning compressor is activated for testing is further included.

BRIEF DESCRIPTION OF THE DRAWINGS

These and other features of the invention will be more clearly understood from a consideration of the following description, taken in connection with the accompanying drawings in which.

DETAILED DESCRIPTION OF THE INVENTION

Figure 1:
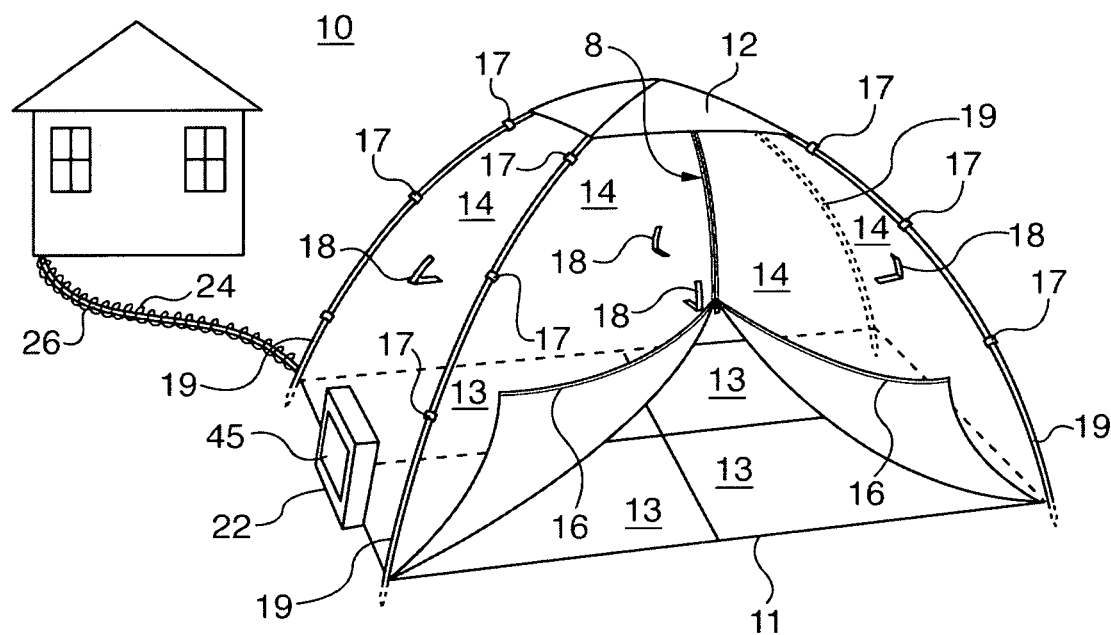
FIG. 1 is a perspective view illustrating a collapsible shelter, having a removable top, a zippered side panel entrance, integrated side wall strut brackets, a segmented zippered floor, an electronics module with rear panel in it's closed position for use as a heater, and an umbilical heating element.

Preliminarily, in accordance with one embodiment of the invention, the lightweight, mobile collapsible shelter 10 of FIG. 1 is constructed of an insulated waterproof material, having an "R Value" Insulation Rating of at least 7-9. As materials and technologies evolve, lighter weight materials with higher R Values may be used that do not negatively impact on the size and weight of the collapsible shelter 10 for storage and portability of the system. The shelter 10 is designed to be approximately 4 feet in height, and 5 feet by 5 feet square in width, to be large enough to cover residential compressors, while minimizing the underlying/surrounding space that needs to be environmentally controlled. The floor of the shelter 11 is divided into 4 equal quadrants 13 with either zippered or hook & loop securement so as to permit the shelter to be slid over the top of the air conditioning compressor, and then to be arranged to cover the cold/frozen earth that surrounds the compressor unit. A removable insulated top panel 12 permits the interior of the shelter to be environmentally controlled once in place, trapping all heat within, yet can be removed when the system is put into the testing mode of operation when activating the Air Conditioning System that is the subject of testing.

Four sidewalls 14 define the shelter 10, with a side panel entrance 8 variably opened by zippering 16. The corners of the sidewalls 14 include a securement means 17 to receive support poles 19 which extend to the earth below. Integrated into the left most sidewall 14 of the shelter 10 and supported by the floor 11 is an electronics module 22 that can operate in both heating and testing modes, as well as the umbilical accessory power port 20 (FIG. 2) for the umbilical heating element 24 that wraps around refrigerant lines 26 that connect the compressor 100 (FIGS. 4-7) to the indoor evaporator parts of the system. Shown in FIG. 2(a), the umbilical heating element 24 is in the form of an insulated "heat tape" that wraps around refrigerant lines 26, and when plugged into the umbilical accessory power port 20, the resistance in the tape creates heat sufficient to maintain a constant temperature within the lines 26.

In testing the air conditioning system, the Home Inspector would first set up the shelter 10 by initially loosening the four floor quadrants 13 of the shelter 10, and placing the shelter 10 over the air conditioning compressor 100 so that the compressor 100 is centered within the shelter 10. Thereafter, the Home Inspector would zipper or otherwise close the quadrants 13 as near to the compressor 100 as possible for the floor of the shelter 11 to cover the cold earth surrounding the compressor 100 so as to better insulate the environmental space therein. The umbilical heating element 24 is then wrapped around the refrigerant line 26 until it reaches the foundation of the house, enclosing them in an insulated sleeve 27, (FIG. 2(a)) and plugged into the umbilical accessory power port 20 on the electronics module 22.

Figure 2:
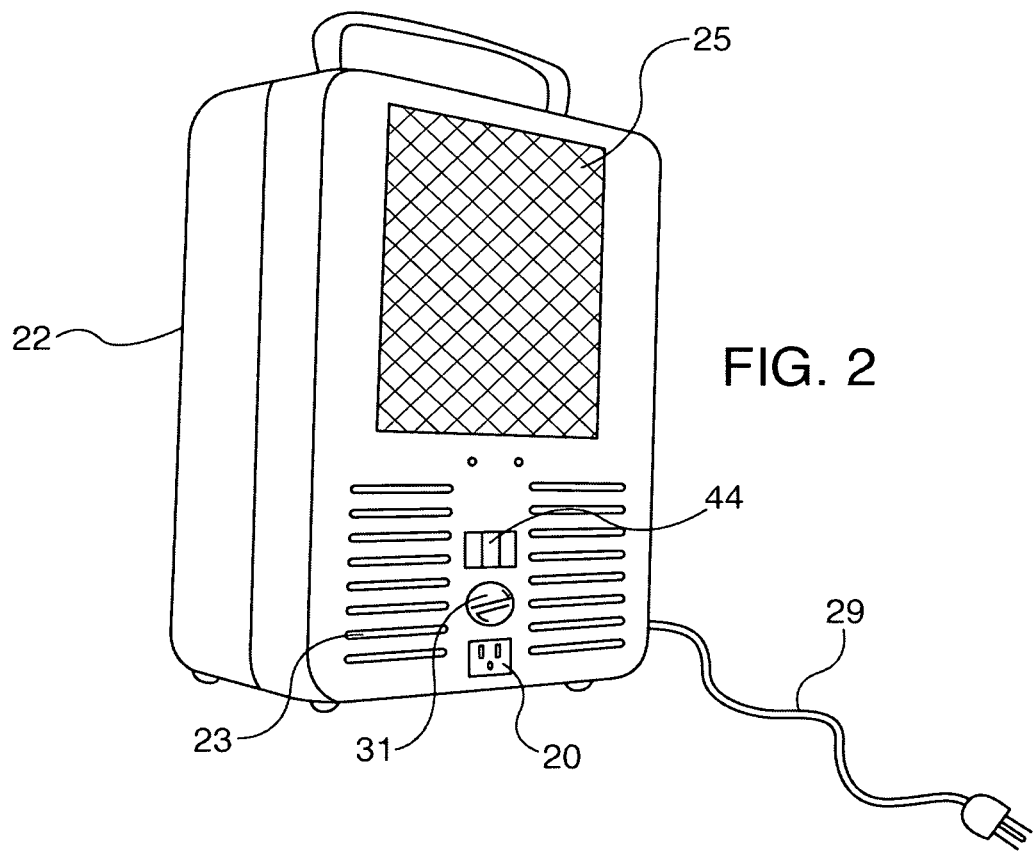
FIG. 2 illustrates an electronics module which includes the heater/venting with variable speed fan, an umbilical accessory outlet, thermostat, and integrated power cord.
Figure 2A:
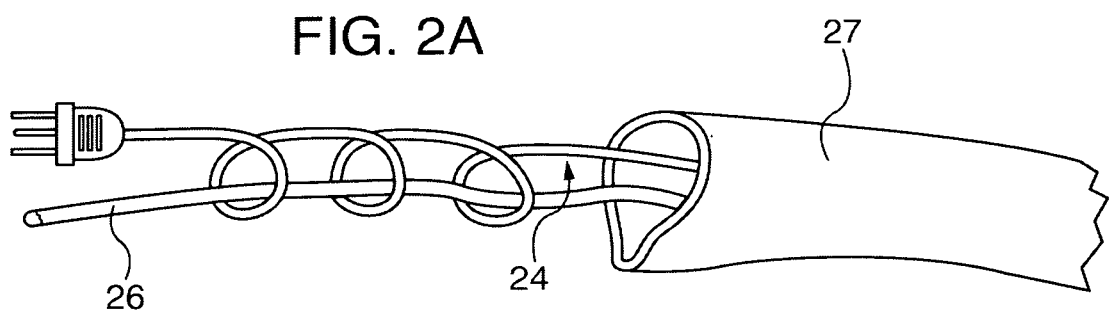
FIG. 2(a) shows the umbilical heating element, with insulating wraps.
Figure 2B:
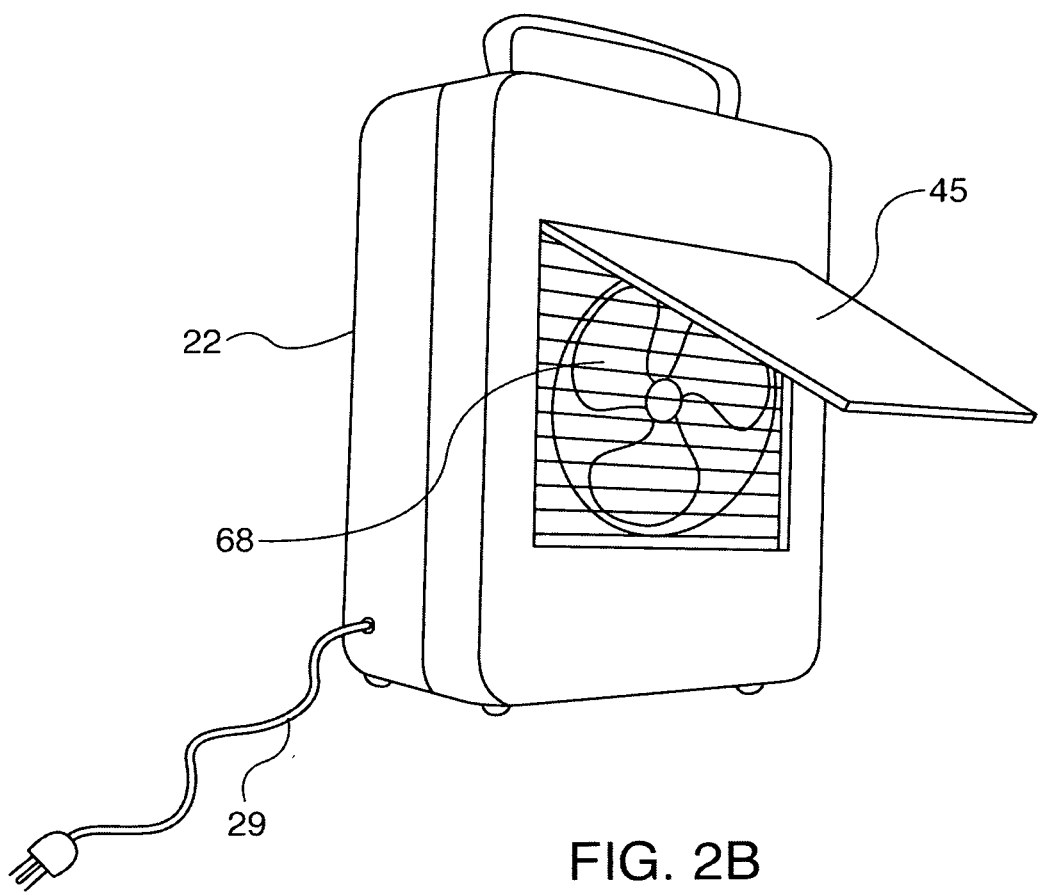
FIG. 2(b) shows the back of the electronics module with it's rear panel intake vents open to permit switching it into a testing mode, and an integrated power cord.

FIG. 2 more clearly shows the inner face of the electronics module 22, which includes the front panel intake vents 23, to recycle the air in a heating mode of operation, blower vents 25, the umbilical accessory outlet power port 20, heating/testing selector switch 31, programmable thermostat 44, and integrated power cord 29. In FIG. 2(a), the umbilical heating element 24 is wrapped around the compressor tubing 26, with the insulating sleeve 27 wrapped over the two, ready for plugging into the umbilical accessory outlet power port 20. In FIG. 2(b) illustrating the back of the electronics module 22, it's rear panel intake vents 45 is open to expose a variable speed fan 68 to permit the electronics module 22 to operate in a testing mode of operation, drawing cold outside air into the shelter 10. It's integrated power cord is shown as 29.

Figure 4:
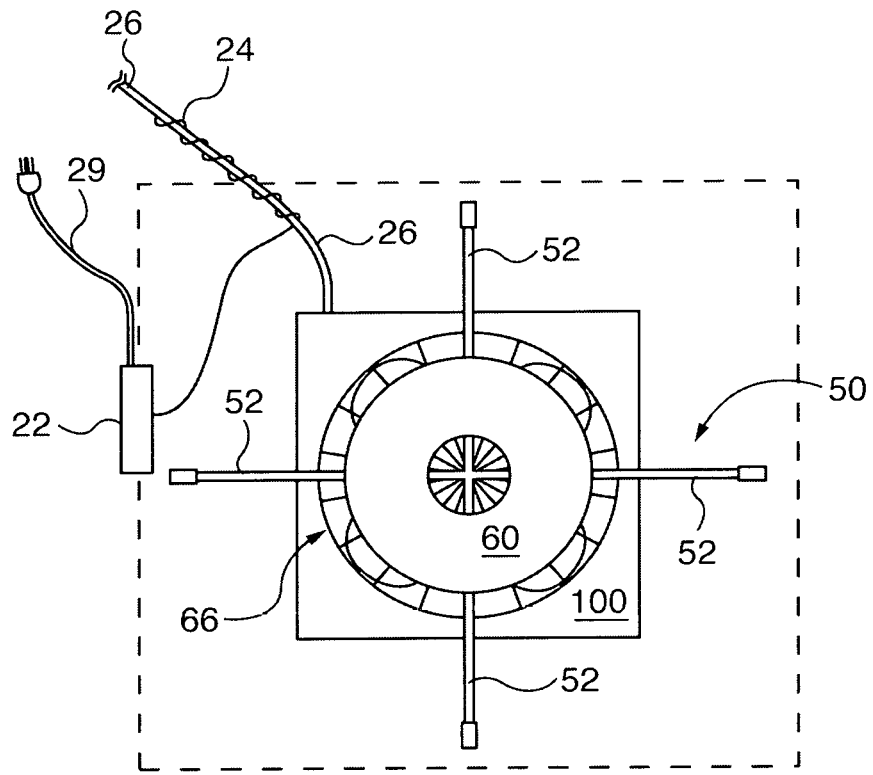
FIG. 4 illustrates a collapsible cross member wall support inserted into the wall strut brackets used to prevent the side walls of the shelter from sucking against the sides of the compressor when the compressor fan is activated, the conical diffuser installed on top of the compressor, and the installed umbilical heating element on the refrigerant tubing.
Figure 5:
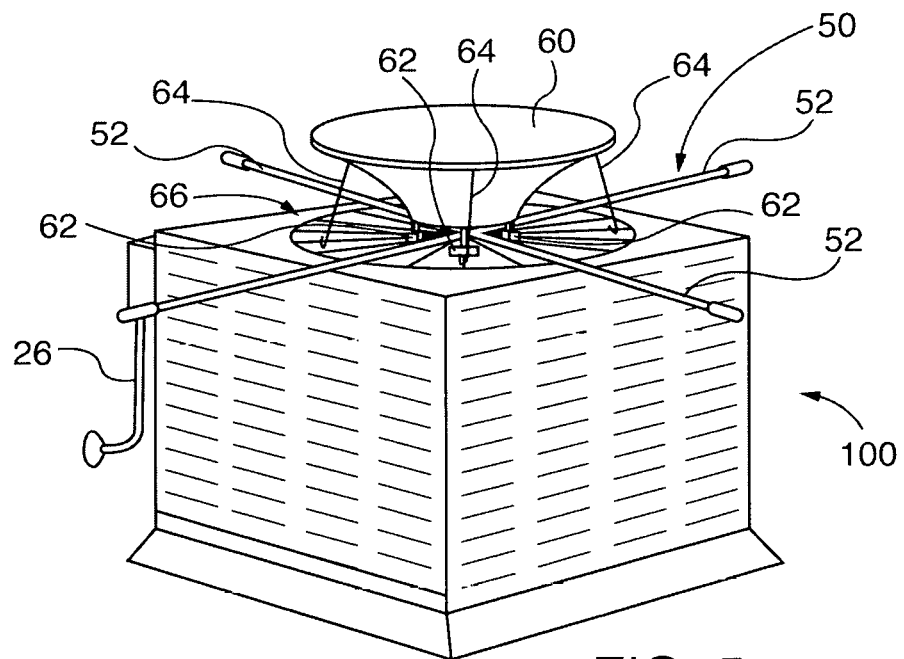
FIG. 5 illustrates a perspective view of a typical air conditioning compressor with the collapsible cross member wall support and conical diffuser attached with both magnetic and bungee cord securements.

Thereafter, as shown in FIGS. 4 & 5, the Home Inspector installs a collapsible cross member wall support 50 by opening it's stiffening cross members 52 from their collapsed quiescent state into an open position, placing them above the air conditioning compressor 100 and inserting their ends into strut brackets 18 on each side wall 14 of the shelter 10 (FIG. 1) so as to prevent the shelter side walls 14 from collapsing against the sides of the compressor 100. (FIGS. 4-7)

Lastly, the Home Inspector places a conical diffuser 60 atop the compressor 100, centered over the compressor fan, and held in place with integrated magnets 62. (FIG. 3) Although bungee cord securements 64 are illustrated, these need only be employed when the compressor's metal grill structure 66 covering the internal fan blades, is not magnetically adhered to. (FIGS. 4-7)

Once the shelter is erected, the Home Inspector plugs the electronics module 22 into a standard outlet, or extension cord and put into it's heater mode of operation. The rear panel intake vents 45 (FIG. 2(*b*)) that cover the back of the variable speed fan 68 within the electronics module 22 when closed and secured to cause the electronics model 22 to draw air through the front panel intake vents 23 from inside the shelter and across the internal heating element. The programmable thermostat 44 is adjusted to control the internal heating element of the electronics module 22 and the variable speed fan 68 to maintain a constant temperature in the shelter of approximately 80° F. (above the 65° F. limits of the typical compressor operation.) When in the heating mode configuration, the variable speed fan 68 directs heated air at the compressor 100, and circulates the air within the shelter 10 to evenly heat all parts of the compressor 100. Once so activated, the open front door of the shelter is closed. (as by zippering), thereby sealing off the outside environment. As an option, the electronics module 22 can include a wifi module that permits transmission of the temperature within the shelter 10 to the Home Inspector's computer or Smart Phone for remote monitoring.

Given the "R Value" Insulation Rating factor of the insulated fabric used to construct the shelter, a low wattage heater of between 375/750 watts (typical of small personal heaters made of plastic) is all that is necessary—not only using little power, but also having a low risk of fire. On a windy 15° F. night, for example, after running a heater in 750 watt mode for 30 minutes, the side walls 14 were heated to about 100° F. and the floor covering to 95° F. (Much higher than is needed) Accordingly, lower wattage heating elements would suffice, and with the utilization of higher "R Value" materials even lower power would be required, and/or will properly work in colder environments.

Although the environment in the shelter 10 would quickly exceed the operating temperature designated by the compressor manufacturer, it will take longer for all elements of the Air Conditioning System, refrigerants and lubricants to stabilize. In fact, most manufacturers recommend that one does not run the air conditioning system until there are three consecutive days where the temperature does not fall below 65° F. Accordingly, the Home Inspector would leave the system in place and come back three days later to perform the test. Although the idea of waiting several days is not attractive, Buyers and Sellers of residential properties are used to this already as a radon test is a multi day test as well. With the ability to bring the temperature in the shelter far about 65° F. with the system of the invention, after a certification process with manufacturers of Air Conditioning Systems, a shorter period of stabilizing before testing should be approved.

Once the system is seasoned and ready for testing, the Home Inspector needs to set the shelter apparatus into it's testing mode configuration. By opening the zippered sections 16, a side panel entrance 8 is created, permitting the Home Inspector to enter the Shelter 10 to access the electronics module 22 and switch it (Via selector 31) into a testing mode; with the variable speed fan speed controlled by the programmable thermostat 44 on the electronics module 22, the rear panel intake vents 45 of the module 22 is opened, the front panel intake vents are closed and the insulated top 12 is removed exposing the top of the compressor 100 and the conical diffuser 60. In this configuration the heating element of the electronics module 22, is disabled. The Air Conditioning System of the home is then activated inside the property which will activate the compressor within the shelter.

It is important to have a general understanding that when the air conditioning system is activated, the system captures the heat from the air inside of the house/building, runs it through the system coil where the refrigerant absorbs the ambient heat and transfers it out to the compressor where the heat is released through radiators, and then sent back to the indoor part of the system. During the loop through the system the refrigerant compresses and expands to effectuate the transfer of heat. Although inside the home cold air is circulated through the ductwork, outside the compressor acts as a big heater releasing the heat into the atmosphere. With the compressor enclosed inside a sealed shelter and turned on, a number of things happen: first, the high powered compressor fan turns on, and blows with enough force that if it's force were directed against the top of the shelter, it could cause the shelter to lift up and off the ground and compressor, exposing the compressor to the elements requiring an immediate cessation of the testing. The purpose of the fan is to draw airflow over the radiators that form the sides of the compressor and transferring the heat from the coils to the air for dissipation. By placing the conical diffuser 60 on top of the compressor's metal grill structure 66, it not only redirects the airflow away from the top of the shelter, preventing it from lifting off of the ground, but also acts to redirect the airflow away from the top aperture 21 and towards the sides of the compressor 100 to be recirculated. If the shelter lifted off the ground, or the airflow were permitted to be blown directly through the open top aperture 21 an equal amount of frigid air from outside the shelter 10 would be drawn into the shelter causing the temperature to rapidly drop, requiring the system to be shut down.

Second, due to the strong suction of air through the side wall radiators of the compressor 100, and the flexibility of the fabric side walls 14, to prevent the side walls 14 from being drawn against the sides of the compressor 100 and blocking the airflow, the collapsible cross member wall support 50 acts to hold the walls outward and prevent such occurrence; this allows the free airflow required to permit the operation of the system for accurate testing by the inspector.

Third, the heat being expelled into the shelter by the compressor requires counteracting by mixing in colder air, and permitting heated air to escape through the opening at the top of the shelter. If the shelter were sealed, and no cool air introduced therein, within minutes of the air conditioning systems being activated, the heat inside the shelter would exceed the top temperature range for accurate diagnostic testing by the Home Inspector or operating specification of the manufacturer. To this end, when the rear panel intake vents 45 of the electronics module 22 is opened, the front panel intake vents 23 are closed, and the unit is put into it's testing mode of operation, the thermostatically controlled variable speed fan 68, in the electronics module 22 draws cold air into the shelter from the exterior thereof and blows it onto the compressor unit 100. A combination of the cold air being drawn in to the bottom of the shelter 10 and hot air being displaced through the open top aperture 21 at the top of the shelter after removal of the insulated top 12 maintains the temperature inside of the shelter 10 within the normal ambient air temperature range that a compressor is designed to operate in. In circumstances where the ambient temperature outside of the shelter is not cold enough to offset the heat generated by the compressor during operation, the Home Inspector can open the side panel entrance 8, so as to increase the amount of ventilation of the heated air.

Once the testing of the air conditioning system is completed, the system is taken apart in reverse order of installation for storage and transportation.

Figure 3:
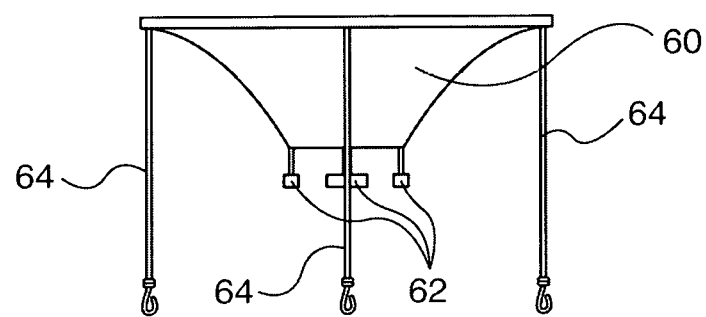
FIG. 3 are multiple views illustrating a conical diffuser that sits on top of the air conditioning compressor fan to redirect and diffuse the vertically concentrated airflow from the compressor fan when activated, preventing the shelter from being lifted off the ground in maintaining a controlled environment and more importantly, redirecting the air from the top of the compressor back to the sides to recirculate the air and maintain the temperature inside the shelter. Additionally magnetic and optional bungee cord securements are disclosed to keep the conical diffuser in place during operation.
Figure 6:
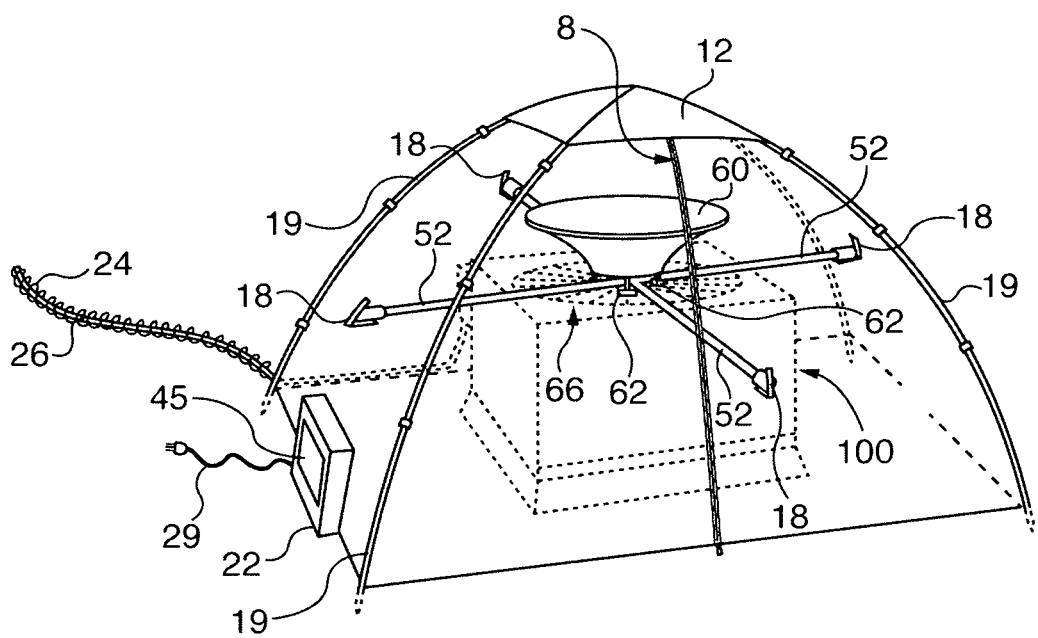
FIG. 6 is a perspective view showing the shelter in it's heating mode of operation, installed over the compressor with the collapsible cross member wall support and conical diffuser installed, along with the electronics module, having it's rear panel intake vent closed and umbilical heating element of FIG. 2(a)
Figure 7:
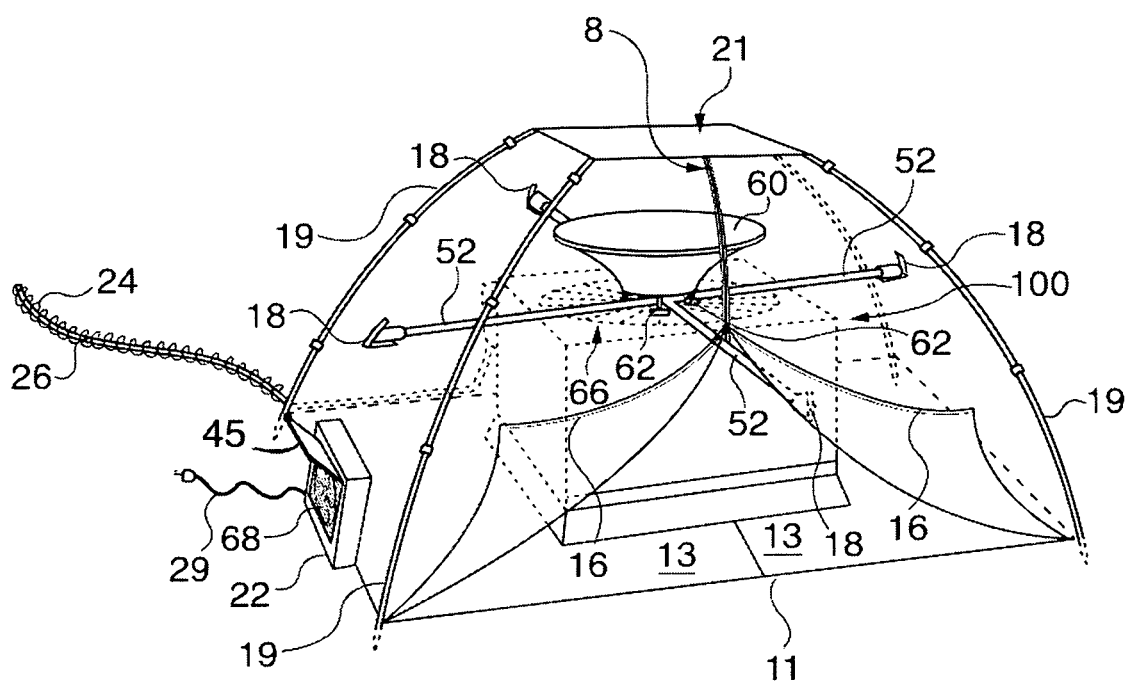
FIG. 7 is a perspective view showing the shelter in it's Air Conditioner testing mode of operation with it's top removed, installed over the compressor with the collapsible cross member wall support and conical diffuser installed, a front access zipper open—along with the electronics module put into testing mode with the rear panel intake vent open to permit the variable speed fan to draw cold air from the exterior of the shelter into the shelter, and umbilical heating element.

In this regard:
a) FIG. 3 shows the conical diffuser 60, installed on top of the compressor's metal grill structure 66, and held in place by the integrated magnets 62 which removably secures it to the top of the compressor 100. In the event the compressor metal grill structure 66 is made of a non-magnetic material, the Home Inspector would secure the conical diffuser 60 to the top of the structure using included bungee cord securements 64 which attach to the lip of the conical diffuser 60 and clip to the grill structure 66.
b) FIG. 4 shows a top perspective of the shelter 10 installed over the compressor 100 and umbilical heating element 24 installed around the refrigerant tubing 26 to and from the house.
c) FIG. 5 shows the collapsible cross member wall support 50 and the conical diffuser 60 installed on the compressor 100 before the shelter 10 is put in place. Once the two elements are installed, the shelter 10 is slid over the top of the compressor 100, and the ends of the stiffening cross members 52 are put into the strut brackets 18 to keep the side walls 14 from being drawn against the side of the compressor 100 during testing.
d) FIG. 6 shows the Shelter 10 in heating mode, with the insulated top 12 installed on the top of the shelter, the umbilical heating element 24 installed around the compressor tubing 26, collapsible cross member wall support 50 and conical diffuser 60 installed on top of the compressor's metal grill structure 66, and electronics module 22 with the rear panel intake vents 45 in it's closed position, and the front door 16 zippered closed.
e) FIG. 7 shows the Shelter 10 in testing mode, with the insulated top 12 removed from the top of the shelter 10 exposing the top aperture 21, the umbilical heating element 24 installed around the refrigerant tubing 26, collapsible cross member wall support 50 and the conical diffuser 60 installed on top of the compressor's metal grill structure 66, and the electronics module 22 with it's rear panel intake vents 45 in it's open position exposing the variable speed fan 68. During operation in testing mode, the programmable thermostat 44 in the electronics module 22 monitors the temperature inside the shelter 10—to counteract the heat being released by the compressor radiators, and to control the variable speed fan 68 to draw colder air into the shelter through the open rear panel intake vents 45 of the electronics module. The colder air being drawn into the shelter 10 from outside then displaces hot air generated by the compressor 100 out of the shelter 10 through the top aperture 21, to maintain a regulated temperature within the shelter below 105° F. In addition to the variable speed fan 68, the side panel entrance 8 may be created by opening the zippered panels 16 if added ventilation is required given the external ambient air temperature. If the air temperature outside the shelter 10 is relatively close to 65°, added ventilation may be required to assist the variable speed fan 68 built into the electronics module 22 in maintaining the temperature in a normal operating range.

After the shelter is put into it's testing mode of operation, the Home Inspector will then turn on the air conditioning system in the home and return to the shelter to monitor the system, as the air conditioner needs to run for a few minutes to stabilize, and for the Home Inspector to verify that the temperature inside the shelter 10 is stable and within proper operating range. If the variable speed fan 68 is insufficient to offset the heat building up inside the shelter, the Home Inspector shall open the side panel entrance to permit greater air flow. Once verified, that the temperature inside the shelter is stable, the Home Inspector will be able to go inside the home and diagnostically test the Air Conditioning System. Once completed, the system is shut off and the shelter can be removed, and disassembled for future use at a different test location.

While there has been described what is considered to be a preferred embodiment of the invention, it will be readily appreciated by those skilled in the art that modifications may be made without departing from the scope of the teachings herein. Thus, as will be seen, the teaching of the invention would apply equally as well in shelters with a different number of walls, different insulated materials, or different heating elements. And, as will be recognized, the teachings of the invention would apply equally as well were the shelter to be pyramidal, cylindrical, three sided, etc. or of larger dimension for use with compressors of larger size—and even in circumstances where the compressor is external to the rear of an operating business to cool the insides of a store location, for example, when testing of an air conditioning system is desired when ambient temperatures are below it's recommended range of operation. Although additional testing and approval by the manufacturers must be obtained, it may be that by raising the temperature to 80° F. or higher could result in much shorter time periods to stabilize, permitting the inspection to be completed in less than three days. And, if a higher power heater were employed, an insulated material of "R Value" of 6, for example, could be used instead to offset the temperature outside, the rating of 7-9 being optimal for most parts of the United States. For at least such reasons, therefore, resort should be had to the appended Claims for a true understanding of the scope of the Invention.

I claim:

1. Apparatus for use in testing structural air conditioner system operation at temperatures below the manufacturer recommended range for the external compressor thereof comprising:

a collapsible removable shelter having a removable top panel sized to overlay the compressor area and surrounding ground environment;

a thermostatically controlled, switchable electronics module integrated with said shelter having an internal heating element, a fan, blower output vents, a front panel intake vent and an openly closable cover overlying a rear panel intake vent external to the shelter, the module being adapted in a first switch position to circulate heated air into said shelter via said front panel intake vent with said overlying cover closed and with said top panel emplaced to raise and maintain the temperature therein to at least said recommended temperature range for a recommended period of time before the compressor is to be activated, and being adapted in a second switch position with said overlying cover open and with said top panel removed to circulate via said rear panel intake vent cooler open air into said shelter to maintain a temperature therein within said recommended temperature range during a running of the activated compressor;

a collapsible cross member wall support within said shelter adapted to maintain structural integrity of sidewalls of said shelter and to prevent said sidewalls from being sucked inward during said running of the compressor;

an air diffuser atop the fan of the compressor adapted with said top shelter panel removed to prevent upward lifting of said shelter off the ground during said running of the compressor and to direct an upward hot exhaust of the compressor fan back to the sides of the compressor to maintain the compressor running within said recommended temperature range;

and an umbilical heating element wrapping around refrigerant lines that are external of said shelter to bring the refrigerant therein into said recommended temperature range before activation of the compressor.

2. The apparatus of claim 1 wherein said shelter is constructed of an lated material of an "R Value" Insulation Rating of at least 7-9.

3. The apparatus of claim 1 wherein said electronics module is coupled with said shelter at a lower end of one of said sidewalls of said shelter.

4. The apparatus of claim 1 wherein said fan within said electronics module is a variable speed fan to blow air against the compressor and circulate the air within said shelter.

5. The apparatus of claim 4 wherein said electronics module contains a programmable thermostat to automatically control said umbilical heating element, said electronics module heating element, and said variable speed fan to provide thermostatically regulated air.

6. The apparatus of claim 5 wherein said electronics module contains an umbilical accessory power outlet.

7. The apparatus of claim 1 wherein said shelter includes an insulated floor adjustable to position said shelter substantially against upwardly extending walls of the compressor.

8. The apparatus of claim 1 wherein said collapsible cross member wall support includes side wall strut brackets on said shelter sidewalls to receive stiffening cross members in retaining said shelter sidewalls in place during a running of the compressor in keeping said sidewalls from being drawn inward and against the sides of the compressor, blocking proper airflow.

9. The apparatus of claim 1 for use in testing residential air conditioning systems at temperatures below 65° F. at the external compressor thereof.

10. The apparatus of claim 1 wherein said electronics module is adapted to draw air from inside said shelter into said module via said front panel intake vent while in a heater mode of operation of the compressor and is adapted to permit cold air to be drawn into said module via said rear panel intake vent from outside of said shelter during a testing mode of operation of the compressor.

11. A transportable, assemblable/disassemblable shelter adapted for placement over the external compressor of a residential air conditioning system in an inspection testing thereof comprising:

side walls positioned adjacent upwardly extending walls of the compressor, a top plane joining upper ends of said sidewalls, an aperture in said top plane overlying the fan of the compressor, a collapsible cross member wall support extending horizontally between oppositely positioned side walls, and a thermostatically controlled electronics module situated inwardly at one of said side walls to increase the temperature within said shelter to at least 65° F. when ambient temperatures at the external compressor fall below said 65° F. temperature.

12. The shelter of claim 11, wherein said shelter is constructed of an insulated material of an "R Value" Insulation Rating value of at least 7-9.

13. The shelter of claim 11, wherein said shelter includes an insulated floor adjustable to position said shelter substantially against the upwardly extending walls of the compressor.

14. The shelter of claim 11, wherein said shelter includes side wall strut brackets to retain said collapsible cross member wall support in place to keep said side walls from being drawn inwards against the compressor during a testing mode of operation of the compressor.

15. The shelter of claim 11, wherein said shelter includes a conical air diffuser to redirect air blown upwardly by the fan of the compressor to said side walls of said shelter during a testing mode of operation of the air conditioning system in preventing said shelter from lifting, and to recirculate the air within said shelter and control the amount of hot air leaving said shelter through said aperture in said top plane.

16. The shelter of claim 11, including front and rear panel air intake vents in said thermostatically controlled electronics module at a lower end of one of said side walls of said shelter.

17. The shelter of claim 16, wherein said thermostatically controlled electronics module is thermostatically operable to maintain the temperature within said shelter to at least 65° F., and below 105° F.

18. Apparatus for use in inspection testing a residential air conditioning systems operating with an external compressor at a temperature below manufacturer recommended range specifications for the compressor comprising: a shelter enclosing the compressor having a removable top panel positioned over an exhaust fan of the compressor; a thermostatically regulated electronics control module to establish temperatures within said shelter at least equal to said recommended range specification with said top panel emplaced; and a collapsible cross member wall support and air diffuser in said shelter to maintain the structural integrity of sidewalls in said shelter, to prevent lifting of said shelter by compressor exhaust fan air flows and to recirculate the air within said shelter in controlling the amount of hot air leaving said shelter with said top panel removed.

19. Apparatus for inspection testing air conditioner systems operation in a split system employing a compressor to be run at an environmental temperature below the temperature range specifications of the compressor comprising:

a transportable assemblable/disassemblable insulated shelter sized to overlay the compressor and the ground surrounding the compressor;

an electronics module for inputting external air into said shelter and circulating air therein;

a thermostatically controlled heating element within said module for increasing and regulating the temperature of the air inside said shelter above said temperature range;

a collapsible cross member wall support for stiffening movement of side walls of said shelter against the compressor;

and a removable top panel in said shelter for exhausting the heated air from said shelter through removal of said panel and for maintaining the temperature of the air inside said shelter below 105° F.

* * * * *